United States Patent
Itami (10) Patent No.: US 9,560,116 B2
(45) Date of Patent: Jan. 31, 2017

(54) NETWORK DEVICE, SYSTEM, METHOD, AND STORAGE MEDIUM

(71) Applicant: CANON KABUSHIKI KAISHA, Tokyo (JP)

(72) Inventor: Tsuyoshi Itami, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 276 days.

(21) Appl. No.: 13/870,486

(22) Filed: Apr. 25, 2013

(65) Prior Publication Data

US 2013/0318144 A1 Nov. 28, 2013

(30) Foreign Application Priority Data

May 23, 2012 (JP) ................................ 2012-117225

(51) Int. Cl.
*H04L 29/08* (2006.01)
*H04L 29/06* (2006.01)

(52) U.S. Cl.
CPC ............ *H04L 67/10* (2013.01); *H04L 63/029* (2013.01)

(58) Field of Classification Search
CPC ........ H04L 29/08; H04L 67/10; H04L 63/029; G06F 21/00; G06F 17/30
USPC ................ 709/201; 721/11; 707/3
See application file for complete search history.

(56) References Cited

U.S. PATENT DOCUMENTS

| 7,747,723 B2 | 6/2010 | Ogawa et al. | |
| 2002/0026379 A1* | 2/2002 | Chiarabini et al. | 705/26 |
| 2002/0100036 A1* | 7/2002 | Moshir et al. | 717/173 |
| 2003/0002077 A1* | 1/2003 | Shima | 358/1.15 |
| 2005/0144521 A1* | 6/2005 | Werner | 714/20 |
| 2006/0126603 A1 | 6/2006 | Shimizu et al. | |
| 2007/0067428 A1 | 3/2007 | Ogawa et al. | |
| 2007/0266212 A1* | 11/2007 | Uchikado et al. | 711/162 |
| 2007/0294228 A1 | 12/2007 | Kawana | |
| 2008/0309975 A1* | 12/2008 | Kondoh | 358/1.15 |
| 2010/0088693 A1* | 4/2010 | Vulugundam | 717/173 |
| 2011/0058215 A1* | 3/2011 | Yoshizumi et al. | 358/1.15 |
| 2012/0036570 A1 | 2/2012 | Wada | |
| 2012/0246339 A1* | 9/2012 | Huang et al. | 709/239 |
| 2013/0254087 A1* | 9/2013 | Rooz et al. | 705/37 |

FOREIGN PATENT DOCUMENTS

| CN | 101030922 A | 9/2007 |
| CN | 101645906 A | 2/2010 |
| JP | 2001-344129 A | 12/2001 |

(Continued)

OTHER PUBLICATIONS

European Search Report dated Sep. 30, 2013, in European Patent Appln. No. 13167019.2.

(Continued)

*Primary Examiner* — Wing F Chan
*Assistant Examiner* — Leon Y Tseng
(74) *Attorney, Agent, or Firm* — Fitzpatrick, Cella, Harper & Scinto (57) ABSTRACT

A first client computer makes an indirect Push communication request for establishing Push communication with a server computer via a second client computer to the second client computer. After establishment of indirect Push communication, a second client computer transfers an instruction given from the server computer to the first client computer by use of Push communication to the first client computer.

14 Claims, 7 Drawing Sheets

(56) References Cited

FOREIGN PATENT DOCUMENTS

| JP | 2006-148661 A | 6/2006 |
|----|---------------|--------|
| JP | 2007-334612 A | 12/2007 |

OTHER PUBLICATIONS

Ric Smith, The Future of the Web: HTML5 Web Sockets, XP-002610911, Aug. 16, 2008, available at http://ricsmith.sys-con.com/node/677813.

Oct. 26, 2015 Chinese Official Action in Chinese Patent Appln. 201310187585.8.

May 17, 2016 Japanese Office Action in Japanese Patent Appln. No. 2012-117225.

Kensaku Komatsu, Next Generation Web Understood Using HTML5 (5th), Nikkei Computer No. 777, Japan, Nikkei BP Inc., Mar. 3, 2011, pp. 119-121.

\* cited by examiner

NETWORK DEVICE, SYSTEM, METHOD, AND STORAGE MEDIUM

BACKGROUND OF THE INVENTION

Field of the Invention

The present invention relates to a technique for controlling communication between a server on a network and a network device.

Description of the Related Art

In a client/server system under Internet environment, it is impossible to transmit data from a server which is the transmission source of various print services to a client-side image forming device which is the execution source of various print services due to firewall. Accordingly, there has been proposed a polling-type communication method in which the inquiry about the presence or absence of a command is made from a client-side image forming device to a server which is the transmission source of various print services. Japanese Patent Laid-Open No. 2007-334612 discloses a device management system in which upon receiving an inquiry about the presence or absence of an instruction across a firewall from a managed device, a management device sends the instruction as a reply to the inquiry in a session established upon reception of the inquiry.

A communication method (Push communication method) that performs Push communication from a server (management device) on the Internet to a network device on an intra-network within a firewall, starting from initial communication (Handshake) from a client, is contemplated. The Push communication method is a communication method that allows the provision of an instruction from a management device without an instruction request (HTTP request or the like) from within a firewall. The Push communication method includes, for example, a protocol (RFC 6455) called "WebSocket".

The management device can distribute a command in real time by communicating in the Push communication method, which eliminates the need for a polling inquiry about the presence or absence of a command in a polling scheme from a network device to a management device. In other words, with the aid of Push communication, the time loss caused by the interval of polling, which have been occurred in prior art, can be eliminated.

However, Push communication has a feature which consistently retains communication connection between network devices and management devices. Thus, in the system in which the upper limit of the number of communication connections between network devices and management devices is set from the viewpoint of cost or the like, the number of connections readily reaches the upper limit value. Consequently, there may be a case where Push communication cannot be established (Handshake cannot be started) between network devices and management devices.

SUMMARY OF THE INVENTION

The present invention provides a network device that can receive an instruction which has been made by a management device by use of Push communication even if the network device and the management device are failed to establish Handshake to start Push communication.

According to an aspect of the present invention, a network device that communicates with an external management device via firewall is provided that includes a receiving unit configured to receive a request for utilizing a predetermined communication method, in which an instruction from the management device is permitted without obtaining an instruction request from within the firewall, as a communication method with the management device from another network device; and a transferring unit configured to transfer an instruction, which has been given from the management device to the another network device by use of the predetermined communication method after the request for utilizing the predetermined communication method, to the another network device.

Further features of the present invention will become apparent from the following description of exemplary embodiments with reference to the attached drawings.

DESCRIPTION OF THE EMBODIMENTS

First Embodiment

Figure 1:
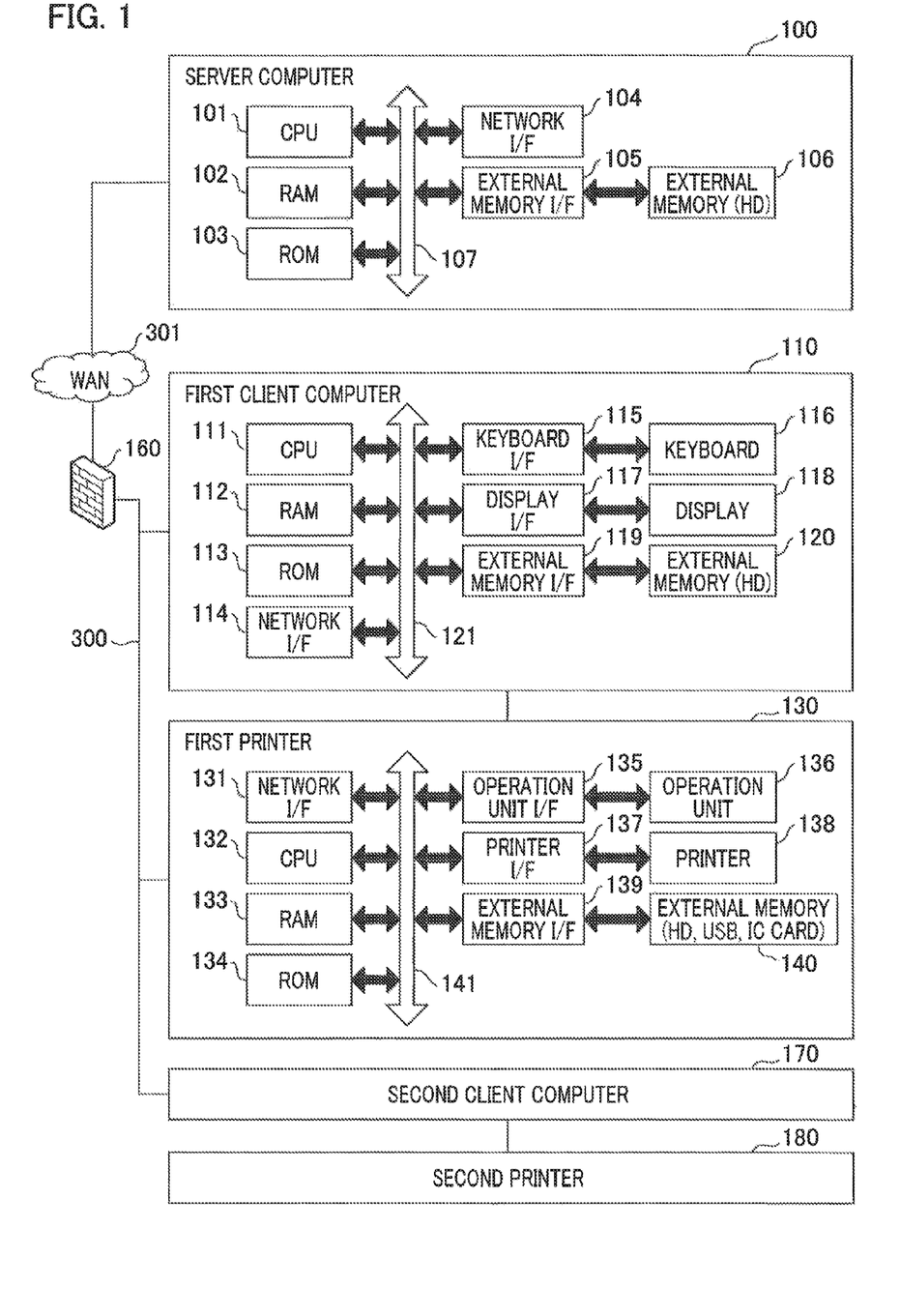
FIG. 1 is a diagram illustrating an exemplary configuration of an information processing system of the present embodiment.

FIG. 1 is a diagram illustrating an exemplary configuration of an information processing system of the present embodiment. The information processing system of the present embodiment is a Push communication type client server system. The Push communication is a predetermined communication method that allows the provision of an instruction from a server computer 100 without an instruction request from within a firewall. In the present embodiment, WebSocket protocol is used as a Push communication protocol. Hereinafter, communication using WebSocket protocol is also described as WebSocket communication.

The information processing system shown in FIG. 1 includes a first client computer 110, a first printer 130, a second client computer 170, a second printer 180, and a server computer 100. The first and second client computers are network devices to be monitored from the server computer 100 via a network. The first and second client computers communicate with the server computer 100, which serves as a management device arranged on the exterior of a firewall 160, via the firewall 160. Each of the first and second client computers is, for example, a network device such as an image forming device, a mobile information terminal, a client PC, or the like.

The server computer 100 is connected to the first and second client computers through the firewall 160 via WAN (Wide Area Network) 301. The first client computer 110 is connected to the second client computer 170 via LAN (Local Area Network) 300. The first printer 130 is connected to the first client computer 110. Also, the second printer 180 is connected to the second client computer 170.

Each of the server computer 100, the first client computer 110, and the second client computer 170 has a generalpurpose computer configuration. In the following description, only one of the hardware configuration of the server computer 100, the first client computer 110, and the second client computer 170 will be given and the duplicated description of the same hardware configuration will be omitted.

The server computer 100 includes a CPU 101, a RAM 102, a ROM 103, a network I/F 104, an external memory I/F 105, and an external memory 106, where CPU is an abbreviation for Central Processing Unit, RAM is an abbreviation for Random Access Memory, and ROM is an abbreviation for Read Only Memory.

The CPU 101 executes processing based on application programs or the like stored in the ROM 103 or the external memory 106. Also, the CPU 101 generally controls the devices connected to a system bus 107. The RAM 102 functions as a main memory, work area, or the like for the CPU 101.

The ROM 103 is a read only memory that functions as a storage region where a basic I/O program or the like is stored. The ROM 103 or the external memory 106 stores an operating system program (hereinafter referred to as "OS") or the like serving as a control program for the CPU 101. Also, the ROM 103 or the external memory 106 stores files and other various data to be used upon performing processing based on the application program or the like.

The network I/F 104 is connected to a network for network communication. The external memory I/F 105 controls access to the external memory 106 such as a hard disk (HD) or the like. The external memory 106 stores a boot program, various applications, user files, edit files, and the like.

The server computer 100 runs in a state where the CPU 101 is executing the basic I/O program and the OS written in the ROM 103 or the external memory 106. The basic I/O program is written in the ROM 103. Also, the OS is written in the ROM 103 or the external memory 106. When the power supply of the computer is turned ON, the OS is written from the ROM 103 or the external memory 106 to the RAM 102 by the initial program loading function in the basic I/O program to thereby start the operation of the OS. Reference numeral 107 denotes a system bus which connects the devices to each other.

The first client computer 110 includes a CPU 111, a RAM 112, a ROM 113, a network I/F 114, a keyboard I/F 115, and a keyboard 116. Also, the first client computer 110 includes a display I/F 117, a display 118, an external memory I/F 119, and an external memory 120.

The keyboard I/F 115 controls input from the keyboard 116 and a pointing device (not shown). The display I/F 117 controls display on the display 118. The CPU 111 opens various registered windows and executes various data processing based on commands instructed by a mouse cursor (not shown) or the like on the display 118.

The first printer 130 includes a network I/F 131, a CPU 132, a RAM 133, a ROM 134, an operation unit I/F 135, an operation unit 136, a printer I/F 137, and a printer 138. Also, the first printer 130 includes an external memory I/F 139 and an external memory 140.

The network I/F 131 is used as a connection bus to the first client computer 110. The CPU 132 outputs an image signal as output information to the printer 138 via the printer I/F 137 connected to a system bus 141 based on a control program or the like. Note that the control program is stored in the ROM 134, the external memory 140, or the like. The CPU 132 can perform communication processing with a computer via the network I/F 131. With this arrangement, the CPU 132 notifies the first client computer 110 of information or the like in the first printer 130. Also, the CPU 132 executes processing based on application programs or the like stored in the ROM 134 or the external memory 140.

The RAM 133 functions as a main memory, work area, or the like for the CPU 132. The RAM 133 is configured such that memory capacity can be increased by an optional RAM which is connected to an additional port (not shown). Note that the RAM 133 is used for an output information expansion region, an environmental data storage region, an NVRAM (Non Volatile Random Access Memory), and the like. Also, the external memory 140 is, for example, a hard disk (HD) or the like. The ROM 134 or the external memory 140 stores a control program for the CPU 132, font data to be used upon generating the output information, information to be used on the first printer 130, and the like. The operation unit I/F 135 serves as an interface with the operation unit 136 and outputs image data to be displayed to the operation unit 136.

The operation unit I/F 135 also receives information which has been input by a user via the operation unit 136. The operation unit 136 corresponds to an operation panel or the like on which operation switches, LED display, and the like are disposed. The printer I/F 137 outputs an image signal as output information to the printer 138 (printer engine). The external memory I/F 139 controls access to the external memory 140 such as a hard disk (HD), a USB storage, an IC card, or the like. The number of external memory is not limited to one but may be at least one or more. The first printer 130 may also be configured such that it is connectable with a plurality of external memories storing built-in fonts as well as programs for interpreting option font cards and printer control languages of different language systems. Furthermore, the first printer 130 may also have an NVRAM (not shown) and store printer mode setting information from the operation unit 136. Reference numeral 141 denotes a system bus which connects the devices to each other.

The configuration of the second client computer 170 is the same as that of the first client computer 110, and thus, explanation thereof will be omitted. Also, the configuration of the second printer 180 is the same as that of the first printer 130, and thus, explanation thereof will be omitted.

Figure 2A:
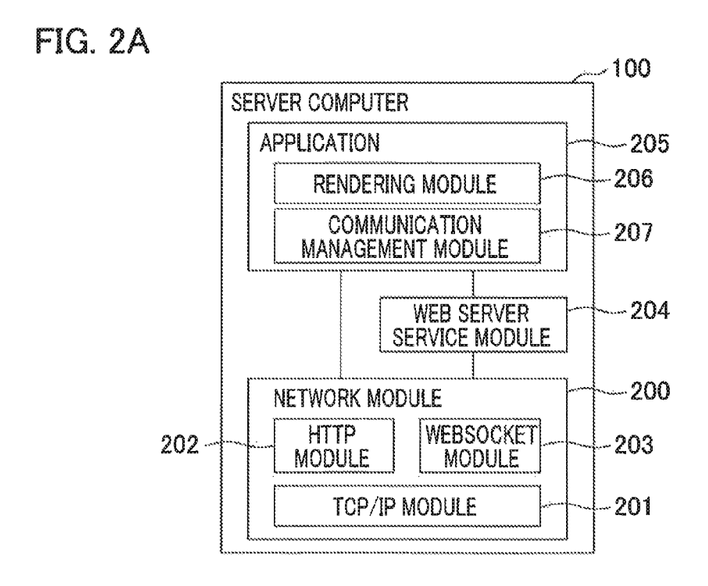
FIGS. 2A to 2C are diagrams illustrating an exemplary software configuration of an information processing system.
Figure 2B:
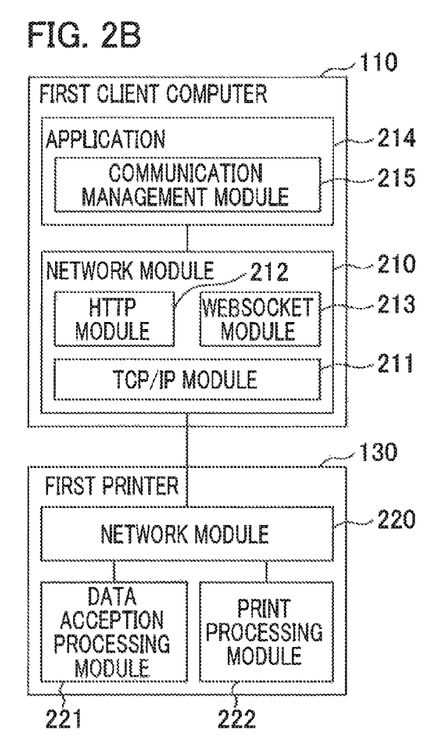
Figure 2C:
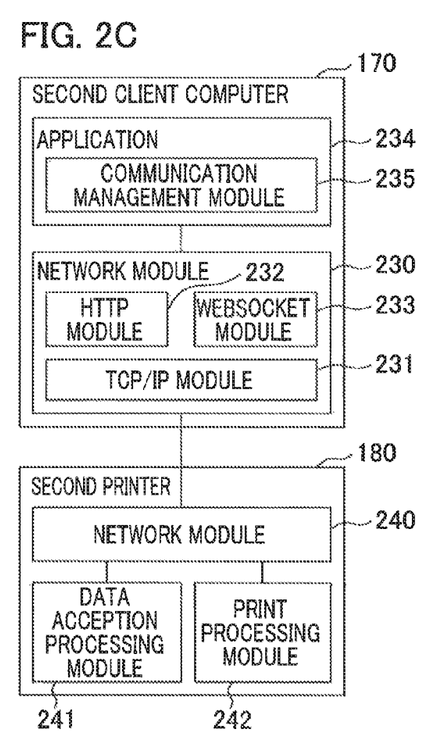

FIGS. 2A to 2C are diagrams illustrating an exemplary software configuration of the information processing system of the present embodiment. FIG. 2A shows a software configuration of the server computer 100. In the server computer 100, each of application 205 and modules is a program module which is present as a file stored in the external memory 106. The application 205 and modules are loaded into the RAM 102 for execution.

The application 205 can be added to the HD of the external memory 106 via a CD-ROM (not shown) provided in the external memory 106 or a network. Reference numeral 200 denotes a network module which performs network communication with a client computer.

The network module 200 has a TCP/IP module 201, an HTTP module 202, and a WebSocket module 203. The TCP/IP module 201 performs network communication using the TCP/IP protocol. The HTTP module 202 uses TCP as a transport protocol and performs network communication using the HTTP protocol.

The WebSocket module 203 uses TCP as a transport protocol and performs network communication using the WebSocket protocol. The Web server service module 204 receives an HTTP request from the client computer 110 to thereby provide a service for responding an HTTP response.

The application 205 converts various data files transmitted from the client computer 110 into a data format printable by the printer 130 connected to the client computer 110. Various data files are data files generated from, for example, Microsoft Office WORD/Excel/PowerPoint. The application 205 transmits the data file converted into a data format printable by the printer 130 to the client computer 110.

The application 205 is implemented as a program that executes processing in response to, for example, an HTTP request. The application 205 realizes a Web application for realizing the following processing together with the Web server service module 204. The Web application receives various data files from the client computer 110, and converts the various data files into a data format printable by the printer 130 connected to the client computer 110.

The application 205 has a rendering module 206 and a communication management module 207. The rendering module 206 interprets various data files. The various data files are submitted from a user via the external memory 140. When the various data files cannot be subject to rendering in a format printable by the printer 130, a data files are transmitted from the client computer 110 to the server computer 100. The rendering module 206 that has received the data file converts the data file into a data file printable by the printer 130 connected to the client computer 110. The communication management module 207 manages connection with a client computer which retains a session using the WebSocket protocol.

FIG. 2B is a diagram illustrating an exemplary software configuration of the first client computer 110 and the first printer 130. Each of modules constituting the client computer 110 is a program module which is present as a file stored in the ROM 113 or the external memory 120. Each module is loaded into the RAM 112 for execution by use of the OS or a module utilizing the module upon execution.

The network module 210 performs network communication with the server computer 100 and the network printer 130. The network module 210 has a TCP/IP module 211, an HTTP module 212, and a WebSocket module 213. The TCP/IP module 211 performs network communication using the TCP/IP protocol. The HTTP module 212 uses TCP as a transport protocol and performs network communication using the HTTP protocol. The WebSocket module 213 uses TCP as a transport protocol and performs network communication using the WebSocket protocol. A communication management module 215 included in an application 214 manages communication with the server computer 100 and communication with the first printer 130.

Next, a description will be given of a software configuration of the first printer 130. In the first printer 130, various modules are present as files stored in the ROM 134 or the external memory 140 and are loaded into the RAM 133 for execution upon execution thereof. The network module 220 performs network communication with the first client computer 110 using any communication protocol. The print processing module 222 receives and controls a print job transmitted from the first client computer 110 as well as performs print processing. The data acception module 221 receives data file input by a user via the external memory 140 and then starts print processing according to the present print system.

FIG. 2C shows a software configuration of the second client computer 170 and the second printer 180. The software configuration of the second client computer 170 is the same as that of the first client computer 110 described above. Also, the software configuration of the second printer 180 is the same as that of the first printer 170 described above. The program of the present embodiment is realized as an application or a module shown in each of FIGS. 2A to 2C.

Hereinafter, a description will be given of the operation of the server computer 100, the first client computer 110, and the second client computer 170 in the information processing system of the first embodiment.

Figure 3:
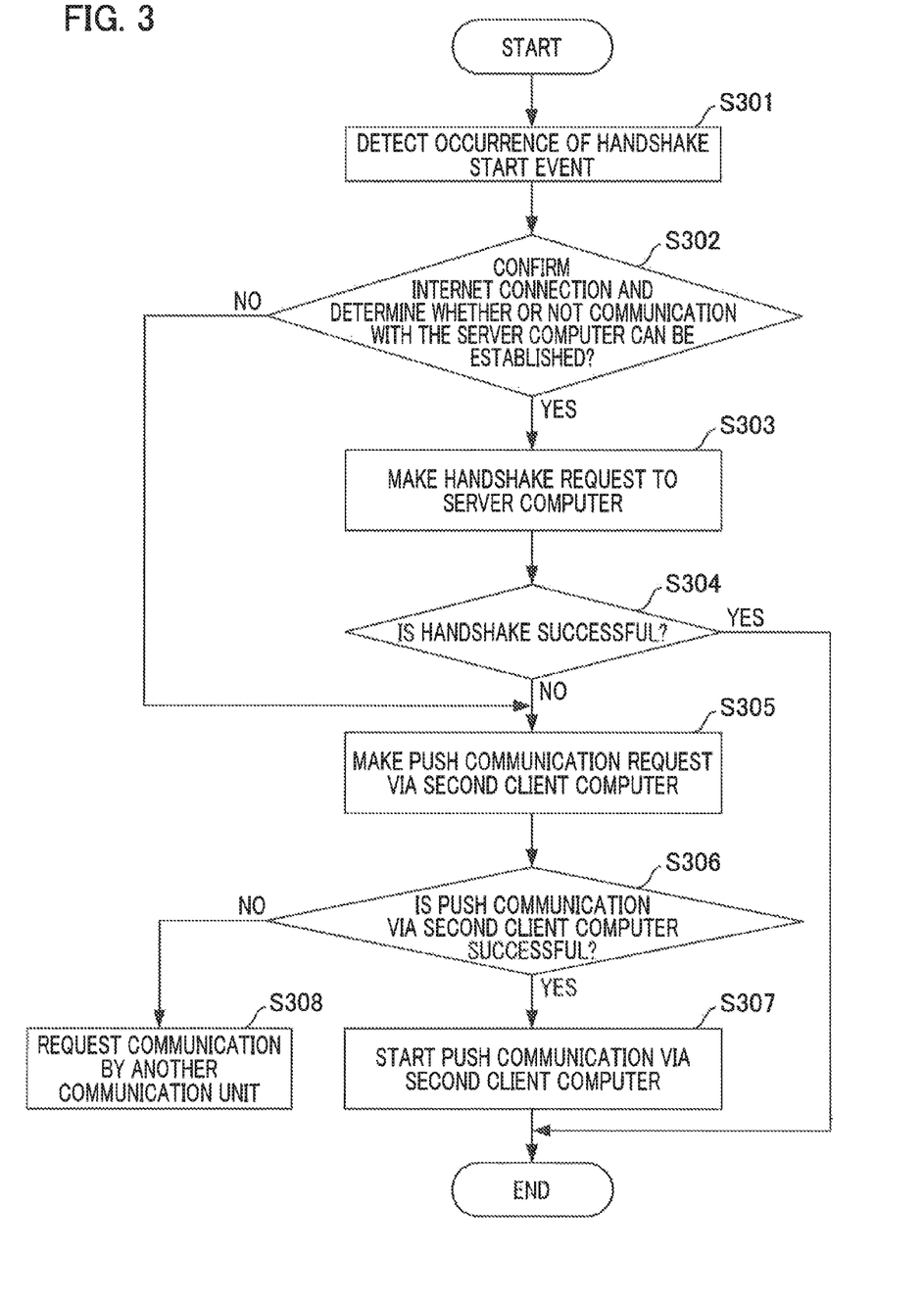
FIG. 3 is a diagram illustrating an example of operation processing performed by a first client computer.

FIG. 3 is a flowchart illustrating an example of operation processing performed by a first client computer. The processes in steps shown in FIG. 3 are executed in accordance with control by the communication management module 215 of the application 214. Firstly, the occurrence of a Handshake start event is detected on a first client computer (step S301). Handshake is attempted in accordance with at least any one of a preset timing, upon turning ON the power supply of the first client computer 110 or the first printer 130, and a management command from the external device. The Handshake start event may be triggered by a timing at which the data input from the external memory 140 such as a USB storage or an IC card to the external memory I/F 130 by a user occurs. The Handshake start event may also be triggered by a timing at which a proximity sensor (not shown) provided in the first printer 130 detects that a user approaches the first printer 130.

Next, in step S302, the HTTP module 212 confirms the Internet connection and determines whether or not communication with the server computer 100 can be established (step S302). More specifically, the HTTP module 212 transmits an HTTP request to the server computer 100 via the TCP/IP module 211 and determines whether or not an HTTP response can be obtained.

When an HTTP response can be obtained from the server computer 100, the HTTP module 212 determines that the device itself is connected to the Internet and thus is communicable with the server computer 100. When an HTTP response is not obtained from the server computer 100, the HTTP module 212 determines that the device itself is not connected to the Internet and is incommunicable with the server computer 100. While, in the determination processing in step S302, whether or not an HTTP response to an HTTP request can be obtained is set as a judgment reference, any other communication method may also be used for the determination processing.

When the device itself is connected to the Internet and is communicable with the server computer 100, the process advances to step S303. When the device itself is not connected to the Internet and is incommunicable with the server computer 100, the process advances to step S305.

In step S303, the WebSocket module 213 makes a WebSocket Handshake request to the server computer 100 via the TCP/IP module 211, and waits for a response from the server computer 100. Next, the WebSocket module 213 determines whether or not HandShake with the server computer 100 is successful (step S304).

When the Handshake response is returned from the server computer 100, the WebSocket module 213 determines that HandShake with the server computer 100 is successful. On the other hand, when HandShake with the server computer 100 is failed, an HTTP Error Code is returned from a computer from which WebSocket communication is requested. Thus, when the HTTP Error Code is returned from the server computer 100, the WebSocket module 213 determines that HandShake with the server computer 100 is failed. When HandShake with the server computer 100 is successful, the process ends. When HandShake with the server computer 100 is failed, the process advances to step S305.

In step S305, the communication management module 215 searches the second client computer 170 that belongs to a network in the same segment as that to which the device itself belongs and is in WebSocket communication with the server computer 100. Then, the communication management module 215 makes the following request to the searched second client computer 170. The communication management module 215 requests Push communication with the server computer 100 via the second client computer 170 (requests indirect Push communication). The indirect Push communication is Push communication with the server computer 100 via the second client computer 170. In other words, an indirect Push communication request is a request for utilizing a Push communication method as a communication method with the server computer 100.

In order to request indirect Push communication, the communication management module 215 searches the second client computer 170 from which Push communication is requested as follows. When the first client computer 110 is communicable with the server computer 100 (Yes in step S302) but HandShake with the server computer 100 is failed, the server computer 100 executes, for example, the following processing. The server computer 100 notifies a first client computer of a second client computer which is in WebSocket communication with the server computer 100 and belongs to the same segment as that to which the first client computer belongs. More specifically, the server computer 100 notifies address information about the second client computer. The address information is, for example, an IP address in the IPv4 network.

The communication management module 215 sets a second client computer corresponding to the notified address information as a computer from which indirect Push communication is requested. A description will be given below of a notification of address information about a client computer, which is currently in the state of WebSocket communication, from the server computer 100 with reference to FIG. 4.

In order for the first client computer 110 to establish indirect Push communication with the server computer 100 via the second client computer 170, the premise is that the following processing is being run. In other words, in order for the first client computer 110 to establish indirect Push communication with the server computer 100, HandShake between the second client computer 170 and the server computer 100 must already be started so as to establish the WebSocket communication.

Also, when the device itself is not connected to the Internet and thus is incommunicable with the server computer 100 (No in step S302), the following processing is executed in step S305. The communication management module 215 searches the second client computer 170 which is in WebSocket communication with the server computer 100 by broadcast and belongs to a network in the same segment as that to which the device itself belongs. Then, the communication management module 215 makes an indirect Push communication request to the searched second client computer 170. Then, the communication management module 235 of the second client computer 170 receives an indirect Push communication request.

Even when the second client computer 170 which belongs to a network in the same segment as that to which the device itself belongs has been searched, there may be a case where the searched second client computer 170 is not in WebSocket communication with the server computer 100. In this case, the communication management module 215 makes an indirect Push communication request to the searched second client computer 170.

The communication management module 235 of the second client computer 170 that has received the indirect Push communication request newly establishes connection between the second client computer 170 and the server computer 100 using WebSocket in response to the request. Then, the communication management module 235 realizes indirect Push communication between the first client computer 110 and the server computer 100. In other words, after reception of an indirect Push communication request, the communication management module 235 transfers an instruction given from the server computer 100 to the first client computer 110 by use of WebSocket to the first client computer 110. More specifically, the communication management module 235 transfers the instruction to the first client computer 110 after establishment of connection using the WebSocket. In other words, in the present embodiment, the second client computer 170 is a broker server that mediates Push communication.

Next, the communication management module 215 determines whether or not indirect Push communication with the server computer 100 is successful (step S306). When indirect Push communication with the server computer 100 is successful, the communication management module 215 starts indirect Push communication (step S307). By performing processing in step S307, the first client computer 110 can perform Push communication with the server computer 100 via the second client computer 170. For example, the communication management module 215 receives an instruction which has been transferred from the second client computer 170 and given from the server computer 100 by the WebSocket communication. Then, the CPU 111 (shown in FIG. 1) executes the received instruction.

A description will be given below of an exemplary operation performed when an instruction given from the server computer 100 is a print instruction. The first client computer 110 transmits a data file input by a user via the external memory I/F 139 and the external memory 140 to the server computer 100 and the server computer 100 starts conversion of the data file into a data format printable by the first printer 130 using the rendering module 206. The Push communication between the first computer 110 and the server computer 100 has already been established. Thus, when the processing by the rendering module 206 in the server computer 100 is completed, a file converted into a data format printable by the first printer 130 is immediately transmitted to the first client computer 100.

When indirect Push communication with the server computer 100 is failed, the communication management module 215 starts communication with the server computer 100 in a communication method other than the Push communication method (step S308). For example, when it is determined in the determination processing in step S302 that the communication with the server computer 100 by an HTTP can be established, the communication management module 215 performs polling-type communication by an HTTP. However, since the communication management module 215 performs polling-type communication by an HTTP, a series of print processing is interrupted as long as the polling inquiry is not made from the first client computer 110 even if the processing by the rendering module 206 in the server computer 100 is completed. Thus, the time loss, which does not occur in indirect Push communication started in step S307, may undesirably occur. When the determination processing in step S302 is failed, the communication management module 215 may also be adapted to display an error status on the operation unit 136 of the first printer 130.

Figure 4:
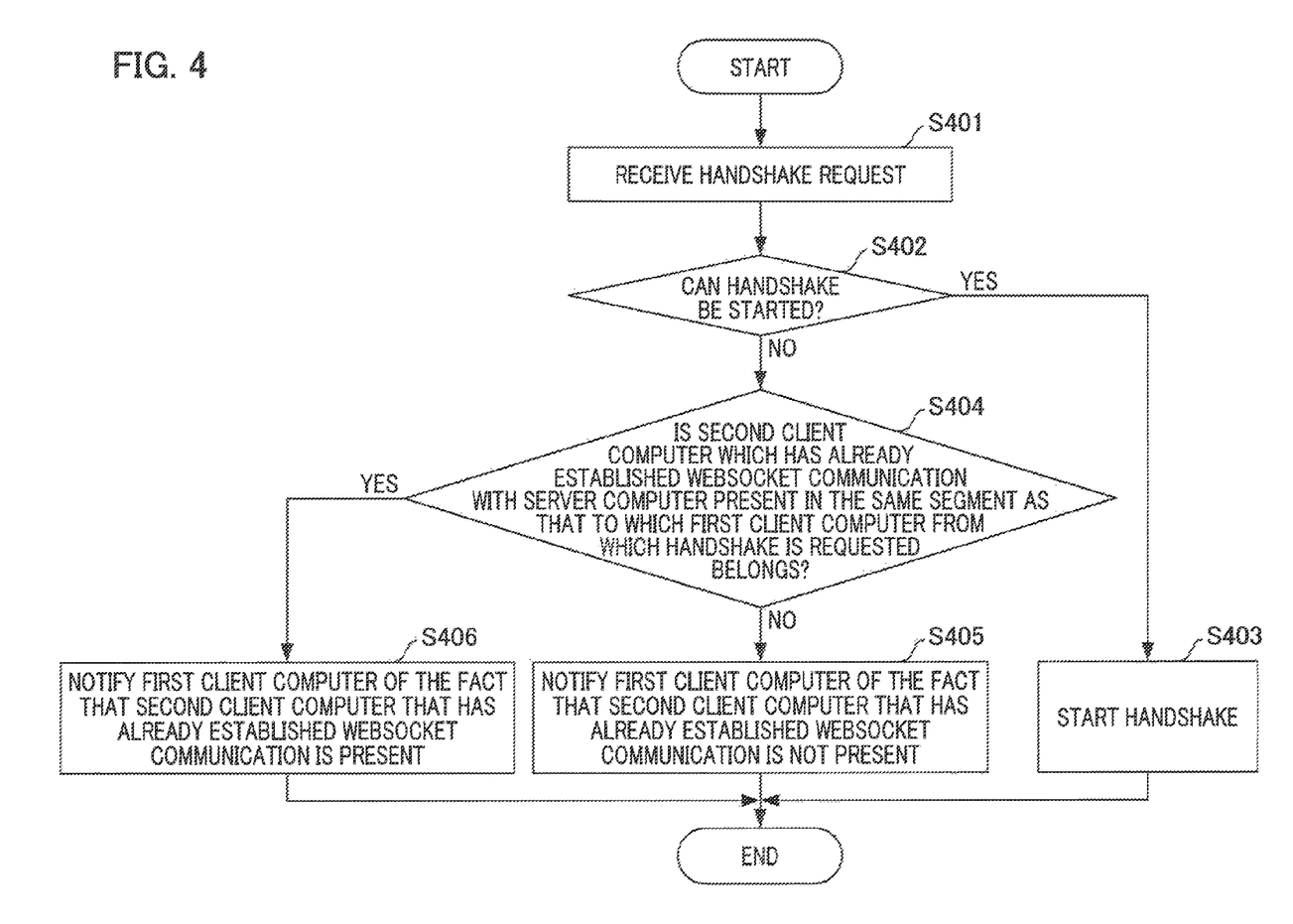
FIG. 4 is a diagram illustrating an example of operation processing performed by a server computer.

FIG. 4 is a flowchart illustrating an example of operation processing performed by a server computer. The WebSocket module 203 provided in the server computer 100 receives the Handshake request, which has been transmitted from the first client computer 110 in step S303 shown in FIG. 3, via the TCP/IP module 201 (step S401).

Next, the communication management module 207 determines whether or not Handshake can be started (step S402). The communication management module 207 determines whether or not the number of communication connections by WebSocket protocol reaches the upper limit value. When the number of communication connections reaches the upper limit value, the communication management module 207 determines that Handshake cannot be started. For example, when the number of communication connections by WebSocket protocol does not reach the upper limit value, the communication management module 207 determines that Handshake can be started. An administrator or the like of the system of the present embodiment sets the upper limit value for the number of communication connections by WebSocket protocol in advance in the communication management module 207 based on reasonable communication cost or the like.

When the communication management module 207 determines that Handshake can be started, the process advances to step S403. When the communication management module 207 determines that Handshake cannot be started, the process advances to step S404.

In step S403, the communication management module 207 starts Handshake with the first client computer 110. The WebSocket communication between the first client computer 110 and the server computer 100 is established at the timing upon start of Handshake.

In step S404, the communication management module 207 executes the following processing. The communication management module 207 determines whether or not a second client computer which is establishing the WebSocket communication with a server computer is present in the same segment as that to which the first client computer 110 from which Handshake is requested belongs.

In step S404, the communication management module 207 specifies the second client computer 170 in the same segment as that to which the first client computer 110 belongs as follows. For example, assume a case where the server computer 100 performs network communication in accordance with IPv4. The communication management module 207 determines whether or not a second client computer having the same IP address as that from the first to the third segment of the first client computer 110 is present. That is, the communication management module 207 specifies a second client computer having the same IP address as that from the first to the third segment of the first client computer 110. Then, the communication management module 207 specifies a second client computer in the same segment as that to which the first client computer 110 belongs.

When the communication management module 207 determines that the second client computer 170 is present, the process advances to step S406. When the communication management module 207 determines that the second client computer 170 is not present, the process advances to step S405.

In step S406, the communication management module 207 notifies the first client computer 110 of address information about the second client computer 170 that has already established the WebSocket communication. The communication management module 207 uses, for example, an IP address as the address information.

In step S405, the communication management module 207 notifies the first client computer 110 of the fact the second client computer 170 that has already established the WebSocket communication is not present.

Figure 5:
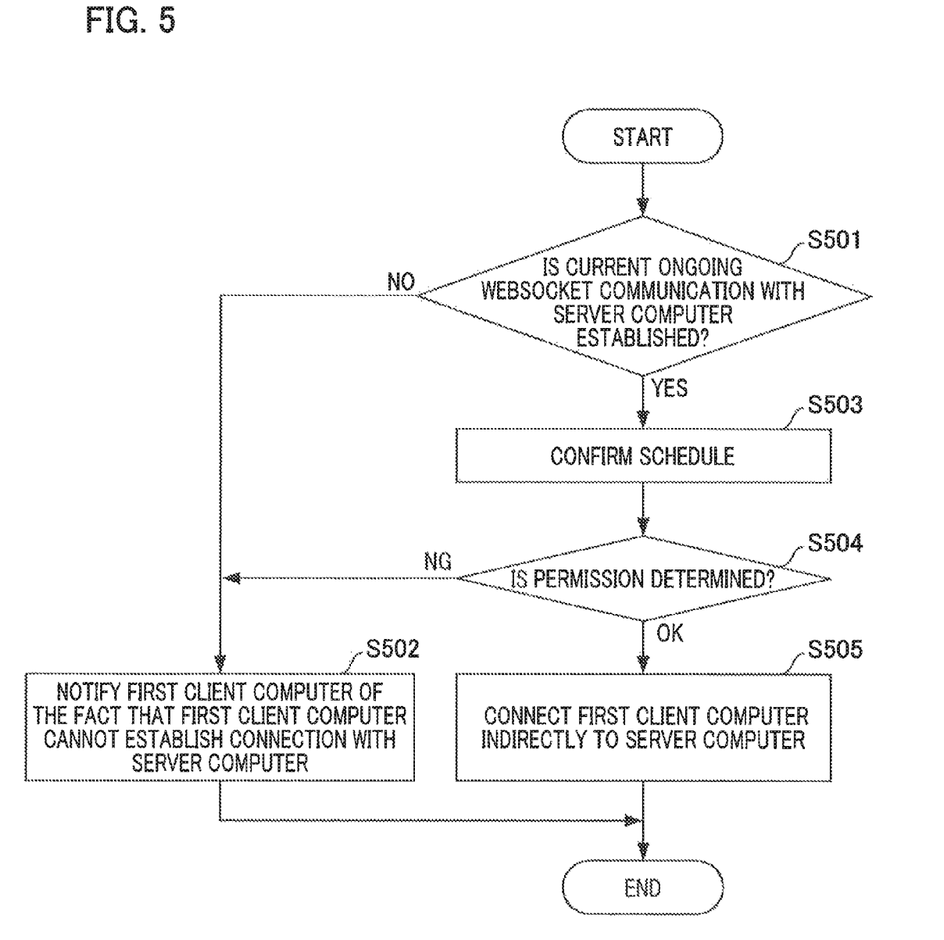
FIG. 5 is a diagram illustrating an example of operation processing performed by a second client computer.

FIG. 5 is a flowchart illustrating an example of operation processing performed by a second client computer. In this example, a description will be given of operation processing performed by the second client computer 170 that has received an indirect Push communication request from the first client computer 110. Firstly, the communication management module 235 provided in the second client computer 170 functions as a first determination unit that executes the following processing. The communication management module 235 determines whether or not the device itself has already been handshaked with the server computer 100 and thus is the ongoing WebSocket communication (step S501). When the device itself has already been handshaked with the server computer 100 and thus is the ongoing WebSocket communication, the process advances to step S503. When the device itself is not in continuation of the WebSocket communication with the server computer 100, the process advances to step S502.

In step S503, the communication management module 235 functions as a second determination unit that executes the following processing. The communication management module 235 confirms the schedule in the second client computer 170 (step S503). More specifically, the communication management module 235 confirms the schedule on which communication is interrupted.

Figure 6:
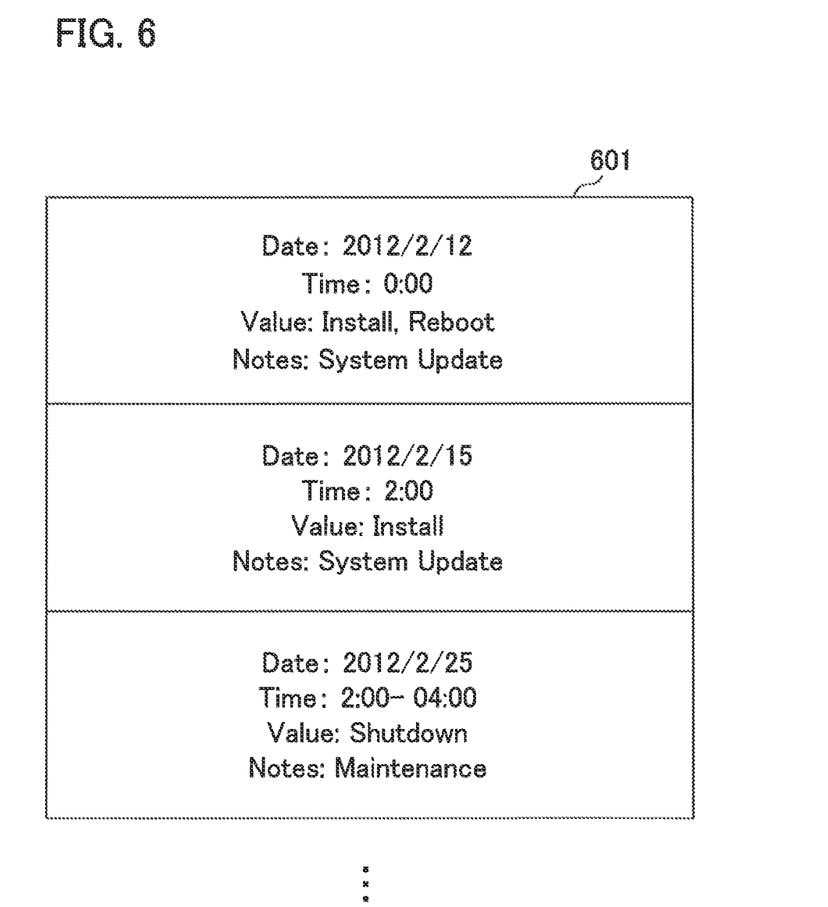
FIG. 6 is a diagram illustrating an exemplary schedule in the second client computer.

FIG. 6 is a diagram illustrating an exemplary schedule in a second client computer. In this example, the processing or the like (install, reboot, or shutdown) scheduled in a second client computer and the date and time at which the processing or the like is executed are set as a schedule 601. The schedule 601 is stored in a storage unit in advance.

Referring back to FIG. 5, in step S504, the communication management module 235 determines whether or not indirect Push communication is permitted based on the schedule confirmed in step S503 (step S504). More specifically, the communication management module 235 determines whether or not the time interval from the start time of confirmation processing in step S503 to the time at which the communication management module 235 becomes unable to communicate with the server computer 100 is equal to or greater than a threshold value. The threshold value is, for example, set by an administrator in advance. When the time interval is equal to or greater than the threshold value, the communication management module 235 determines that indirect Push communication is permitted, and the process advances to step S505. When the time interval is less than the threshold value, the communication management module 235 determines that indirect Push communication is not permitted, and the process advances to step S502.

In step S502, the communication management module 235 notifies the first client computer 110 of the fact that the first client computer 110 cannot perform Push communication with the server computer 100 via the second client computer 170.

In step S505, the communication management module 235 makes it possible for the first client computer 110 to perform Push communication with the server computer 100 via the second client computer 170. More specifically, the communication management module 235 establishes a communication path between the server computer 100 that perform WebSocket communication and the first client computer 110 (functions as a communication path establishing unit). Then, the communication management module 235 transfers the instruction transmitted by the server computer 100 to the first client computer 110.

By performing the above processing, the first client computer 110 can execute the following processing even if the first client computer 110 and the server computer 100 are failed to establish Handshake to start Push communication. The first client computer 110 can indirectly start Push communication with the server computer 100 via the second client computer 170 which has already successfully completed a Handshake operation. Thus, even if the number of communication connections between a client and a server reaches the upper limit value, Push communication between a client computer and a server computer that want to start new Push communication can be started indirectly via another client computer.

In other words, according to the present invention, the network device can receive an instruction which has been made by a management device by use of Push communication via another network device even if the network device and the management device are failed to establish Handshake to start Push communication. Thus, for example, even if the number of communication connections between the network device and the management device reaches the upper limit value, the network device can receive an instruction that is given from the management device in real time.

Second Embodiment

In the second embodiment, an assumption is made that there is a system in which a plurality of second client computers 170 is present in the same segment as that to which the first client computer 110 belongs.

In the second embodiment, in step S406 shown in FIG. 4, the server computer 100 notifies the first client computer 110 of address information about a plurality of second client computers. In step S305 shown in FIG. 3, the first client computer 110 selects one of the notified address information and then makes an indirect Push communication request to a second client computer corresponding to the selected address information. When the request is failed, the first client computer 110 selects another one of the notified address information and then makes an indirect Push communication request to a second client computer corresponding to the selected address information. With this arrangement, there is a high probability that the first client computer 110 can perform indirect Push communication with the server computer 100.

Furthermore, the server computer 100 can grasp a communication state between the server computer 100 and all client computers that have already established the WebSocket communication. Thus, for example, the server computer 100 may preferentially select a second client computer having small communication traffic as a client computer from which indirect Push communication is requested. With this arrangement, optimization (distribution) of communication resources can be realized.

Third Embodiment

In the third embodiment, the first client computer 110 executes the following processing at the timing of execution of processing in step S305 shown in FIG. 3. The first client computer 110 notifies the second client computer 170 of a time (connection maintaining time) for maintaining communication connection required for establishing indirect Push communication with the server computer 100. Thus, in the Handshake start event in step S301 shown in FIG. 3, the communication management module 215 determines a connection maintaining time based on the file size or the number of pages of a data file submitted from a user via the external memory 140.

Assume that the time required per page, which is to be taken from transmission of a data file to the server computer 100 via Internet to reception of the rendering results obtained by rendering the data file by the server computer 100 in Push communication, is defined by an administrator in advance. For example, assume that a connection maintaining time required per page of a data file is defined as one minute. Thus, when the submitted data file is constituted of ten pages, the first client computer 110 requests a second client computer to set ten minutes as a connection maintaining time.

In step S504 shown in FIG. 5, the communication management module 235 determines whether or not indirect Push communication is permitted based on the schedule confirmed in step S503 and the connection maintaining time notified from the first client computer 110. More specifically, the communication management module 235 determines whether or not the time interval from a start time at which confirmation processing in step S503 shown in FIG. 5 is started to a time at which communication is interrupted is equal to or greater than the connection maintaining time. When the time interval is equal to or greater than the connection maintaining time, the communication management module 235 determines that indirect Push communication is permitted.

According to the third embodiment, indirect Push communication can be realized while ensuring a required connection maintaining time in response to the amount of processed data. Thus, when the amount of data to be processed in a data file is large and a required connection maintaining time is long, the risk for lost connection with the server computer 100 during the processing may be reduced. When the amount of data to be processed in a data file is small and a required connection maintaining time is short, there is a high probability that indirect Push communication in step S504 shown in FIG. 5 is permitted.

Fourth Embodiment

In the fourth embodiment, the first client computer 110 requests the second client computer 170 to establish indirect Push communication with the server computer 100 immediately after occurrence of a Handshake start event. When indirect Push communication is failed, the first client computer 100 makes a Handshake request directly to the server computer 100.

Figure 7:
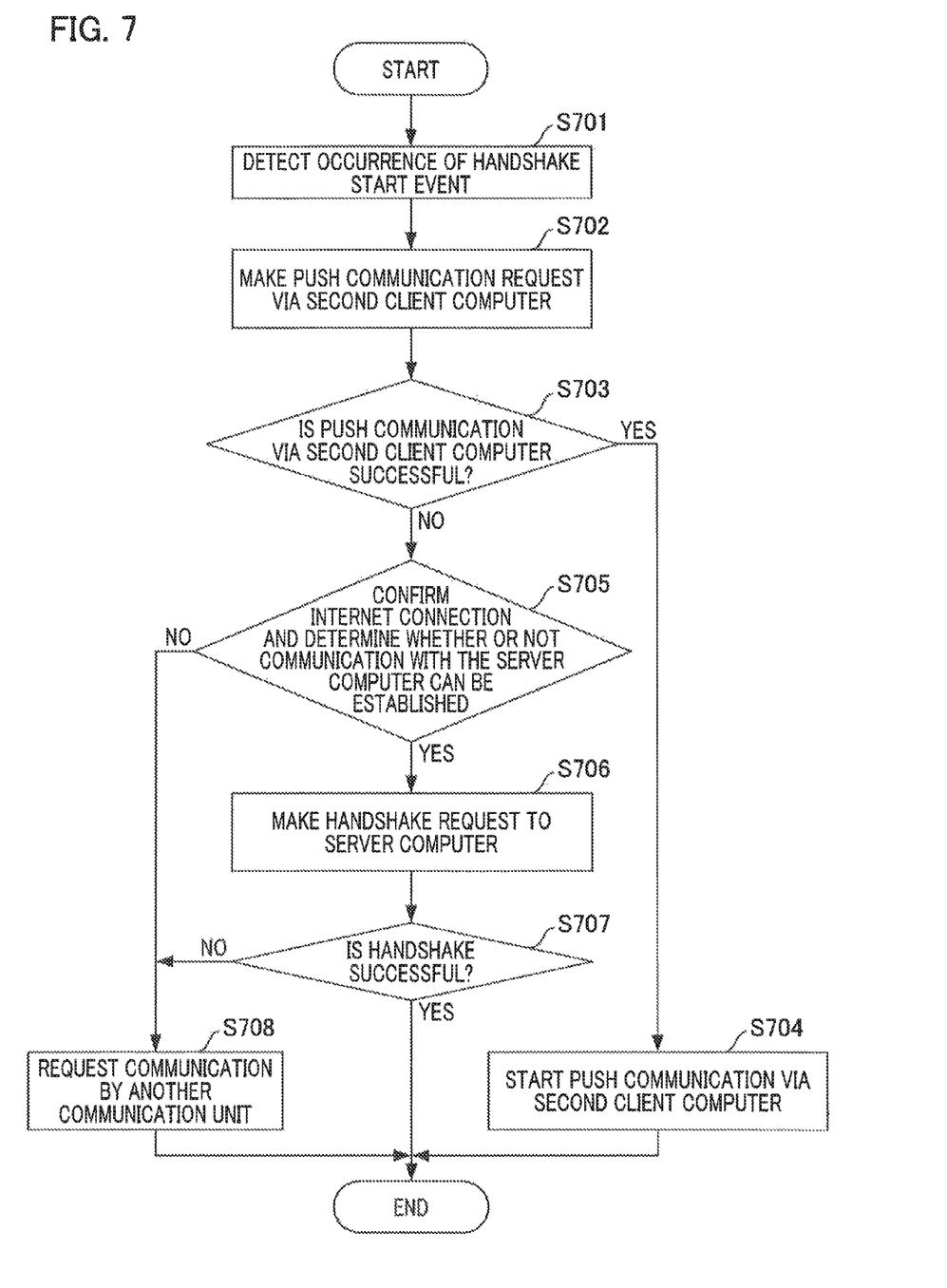
FIG. 7 is a diagram illustrating an example of operation processing performed by a first client computer.

FIG. 7 is a flowchart illustrating an example of operation processing performed by a first client computer of the fourth embodiment. The processes in step S701, step S702, step S703, step S704, and step S708 shown in FIG. 7 are the same as those in step S301, step S305, step S306, step S307, and step S308 shown in FIG. 3. Also, the processes in steps S705 to S707 shown in FIG. 7 are the same as those in steps S302 to S304 shown in FIG. 3.

In the fourth embodiment, the first client computer 110 firstly makes an indirect Push communication request to the second client computer 170 (step S702). When indirect Push communication is failed, the first client computer 100 attempts a WebSocket Handshake request to the server computer 100 (step S706). Thus, there is a reduced likelihood that the first client computer 110 makes a Handshake request to the server computer 100 to thereby newly generate communication connection. With this arrangement, resource consumption such as connection with the server computer 100 may be reduced.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-117225 filed on May 23, 2012, which is hereby incorporated by reference herein in its entirety.

What is claimed is:

1. A second network device that communicates with a management device via a firewall, the second network device comprising:
   a memory; and
   a processor in communication with the memory, the processor being configured to act as units comprising:
   a connection establishing unit configured to establish a connection with the management device using a Websocket protocol, wherein the connection with the management device using the Websocket protocol is established beginning at a handshake request from the second network device to the management device;
   a receiving unit configured to receive, from a first network device, a request for utilizing the Websocket protocol as a communication method with the management device, wherein the received request is different from the handshake request;
   a first determining unit configured to determine whether or not the second network device itself is in communication with the management device using the WebSocket protocol after the receiving unit receives the request for utilizing the WebSocket protocol; and
   a transferring unit configured to transfer an instruction, which has been given from the management device by use of the connection established by the connection establishing unit, to the first network device when the first determining unit determines that the second network device itself is in communication with the management device using the WebSocket protocol.

2. The second network device according to claim 1, wherein the processor is further configured to act as a second determining unit configured to determine whether or not a time to be taken until the second network device itself is unable to communicate with the management device is equal or greater than a predetermined threshold value based on the schedule of the second network device itself when it is determined that the second network device itself is in communication with the management device using the Websocket protocol, wherein, when it is determined that a time to be taken until the second network device itself is unable to communicate with the management device is equal to or greater than a predetermined threshold value, the transferring unit transfer the instruction given from the management device which is in communication using the Websocket protocol to the first network device.

3. The second network device according to claim 2, wherein the threshold value is a connection maintaining time for maintaining connection with the management device, where the connection maintaining time is notified from the first network device and is determined depending on the amount of data to be processed by the first network device.

4. A first network device comprising:
   a memory; and
   a processor in communication with the memory, the processor being configured to act as units comprising:
   (a) a determining unit configured to determine whether or not the first network device itself is able to communicate with a management device by HTTP via a firewall;
   (b) a connection establishing unit configured to transmit, when the determining unit determines that the first network device itself is able to communicate with the management device by HTTP, a handshake request to the management device for establishing a connection with the management device using a Websocket protocol;
   (c) a requesting unit configured to make, when the determining unit determines that the first network device itself is able to communicate with the management device by HTTP and the connection fails using the WebSocket protocol in the handshake request, a request for utilizing the WebSocket protocol to a second network device within the firewall;
   (d) a receiving unit configured to receive an instruction, which has been transferred from the second network device after the request for utilizing the Websocket protocol, the instruction having been given from the management device through a connection between the management device and the second network device using the Websocket protocol; and
   (e) an executing unit configured to execute the received instruction,
   wherein the connection using the Websocket protocol is established beginning at a handshake request from the second network device to the management device.

5. The first network device according to claim 4, wherein the second network device is a broker server that mediates the Websocket protocol.

6. The first network device according to claim 4, wherein the requesting unit makes the request, which is notified from the management device, to the second network device which is in communication with the management device using the Websocket protocol when establishment of connection with the management device using the Websocket protocol by means of the first network device itself was unsuccessful.

7. The first network device according to claim 4, wherein connection with the management device using the Websocket protocol by means of the first network device itself is attempted in accordance with at least one of a preset timing, upon turning the power supply of the device itself ON, and a management command from the management device.

8. The first network device according to claim 4, wherein the processor is further configured to act as a searching unit configured to search the second network device which is in communication with the management device using the Websocket protocol when the determining unit determines that the first network device itself is able to communicate with the management device by HTTP and the connection fails using the Websocket protocol in the handshake request, and wherein the requesting unit makes the request to the searched second network device.

9. A method in a second network device that communicates with a management device via a firewall, the method comprising:

establishing a connection with the management device using a Websocket protocol, wherein the connection with the management device using the Websocket protocol is established beginning at a handshake request from the second network device to the management device;

receiving, from a first network device, a request for utilizing the Websocket protocol as a communication method with the management device, wherein the received request is different from the handshake request;

determining whether or not the second network device itself is in communication with the management device using the Websocket protocol after the request for utilizing the Websocket protocol is received; and transferring an instruction, which has been given from the management device by use of the connection established by the establishing step, to the first network device when it is determined that the second network device itself is in communication with the management device using the WebSocket protocol.

10. A method in a first network device, the method comprising:

determining whether or not the first network device itself is able to communicate with a management device by HTTP via a firewall;

transmitting, when it is determined that the first network device is able to communicate with the management device by HTTP, a handshake request to the management device for establishing a connection with the management device using a WebSocket protocol;

making, when it is determined that the first network device itself is able to communicate with the management device by HTTP and the connection fails using the WebSocket protocol in the handshake request, a request for utilizing the WebSocket protocol to a second network device within the firewall;

receiving an instruction, which has been transferred from the second network device after the request for utilizing the WebSocket protocol, the instruction having been given from the management device through a connection between the management device and the second network device using the WebSocket protocol; and executing the received instruction, wherein the connection using the WebSocket protocol is established beginning at a handshake request from the second network device to the management device.

11. A non-transitory storage medium on which is stored a computer program for making a computer execute a method in a second network device that communicates with a management device via a firewall, the method comprising:

establishing a connection with the management device using a Websocket protocol, wherein the connection with the management device using the Websocket protocol is established beginning at a handshake request from the second network device to the management device;

receiving, from a first network device, a request for utilizing the Websocket protocol as a communication method with the management device, wherein the received request is different from the handshake request;

determining whether or not the second network device itself is in communication with the management device using the Websocket protocol after the request for utilizing the Websocket protocol is received; and transferring an instruction, which has been given from the management device by use of the connection established by the establishing step, to the first network device when it is determined that the second network device itself is in communication with the management device using the WebSocket protocol.

12. A non-transitory storage medium on which is stored a computer program for making a computer execute a method in a first network device, the method comprising:

determining whether or not the first network device itself is able to communicate with a management device by HTTP via a firewall;

transmitting, when it is determined that the first network device is able to communicate with the management device by HTTP, a handshake request to the management device for establishing a connection with the management device using a WebSocket protocol;

making, when it is determined that the first network device itself is able to communicate with the management device by HTTP and the connection fails using the WebSocket protocol in the handshake request, a request for utilizing the WebSocket protocol to a second network device within the firewall;

receiving an instruction, which has been transferred from the second network device after the request for utilizing the WebSocket protocol, the instruction having been given from the management device through a connection between the management device and the second network device using the WebSocket protocol; and executing the received instruction, wherein the connection using the WebSocket protocol is established beginning at a handshake request from the second network device to the management device.

13. A system comprising:

a management device; and a network device and a broker server that communicate with the management device provided outside a firewall via the firewall, wherein the broker server includes:

(a) a memory, and (b) a processor in communication with the memory, the processor being configured to act as units comprising:

(1) a connection establishing unit configured to establish a connection with the management device using a WebSocket protocol, wherein the connection with the management device using the WebSocket protocol is established beginning at a handshake request from the broker server to the management device;

(2) a receiving unit configured to receive, from the network device, a request for utilizing the WebSocket protocol as a communication method with the management device, wherein the received request is different from the handshake request;

(3) a first determining unit configured to determine whether or not the broker server itself is in communication with the management device using the WebSocket protocol after the receiving unit receives the request for utilizing the WebSocket protocol; and (4) a transferring unit configured to transfer an instruction, which has been given from the management device by use of the connection established by the connection establishing unit, to the network device when the first determining unit determines that the broker server itself is in communication with the management device using the WebSocket protocol; and wherein the network device includes:

(a) a memory, and (b) a processor in communication with the memory, the processor being configured to act as units comprising:

(1) a determining unit configured to determine whether or not the network device itself is able to communicate by HTTP with the management device;

(2) a connection establishing unit configured to transmit, when the determining unit determines that the network device itself is able to communicate with the management device by HTTP, a handshake request to the management device for establishing a connection with the management device using the WebSocket protocol;

(3) a requesting unit configured to make, when the determining unit determines that the network device itself is able to communicate with the management device by HTTP and the connection fails using the WebSocket protocol in the handshake request, a request for utilizing the WebSocket protocol to the broker server;

(4) a receiving unit configured to receive an instruction, which has been transferred from the broker server after the request for utilizing the WebSocket protocol, the instruction having been given from the management device through a connection between the management device and the broker server using the WebSocket protocol; and (5) an executing unit configured to execute the received instruction.

14. A method in a system comprising a management device, a network device, and a broker server, the method comprising:

establishing, by the broker server, a connection with the management device using a WebSocket protocol, wherein the connection with the management device using the WebSocket protocol is established beginning at a handshake request from the broker server to the management device;

determining, by the network device, whether or not the network device itself is able to communicate with the management device provided outside the firewall by HTTP via the firewall;

transmitting, by the network device, when it is determined that the network device is able to communicate with the management device by HTTP, a handshake request to the management device for establishing a connection with the management device using the WebSocket protocol;

making, by the network device, when it is determined that the network device itself is able to communicate with the management device by HTTP and the connection fails using the WebSocket protocol in the handshake request, a request for utilizing the WebSocket protocol to the broker server;

receiving, by the broker server, from the network device, a request for utilizing the WebSocket protocol, wherein the received request is different from the handshake request;

determining, by the broker server, whether or not the broker server itself is in communication with the management device using the Websocket protocol after the request for utilizing the Websocket protocol is received;

transferring, by the broker server, an instruction, which has been given from the management device by use of the connection established by the establishing step, to the network device when it is determined that the broker server itself is in communication with the management device using the WebSocket protocol;

receiving, by the network device, an instruction which has been transferred from the broker server after the request for utilizing the WebSocket protocol, the instruction having been given from the management device through a connection between the management device and the broker server using the WebSocket protocol; and executing, by the network device, the received instruction.

* * * * *